(12) United States Patent
Sims et al.

(10) Patent No.: US 8,151,473 B2
(45) Date of Patent: Apr. 10, 2012

(54) ARCHERY BOW SIGHT

(76) Inventors: Steven C. Sims, Shelton, WA (US);
George Clark, Lacey, WA (US); Scott Eastman, Dupont, WA (US); Johnathan F. Seil, Shelton, WA (US); Greg Winters, Shelton, WA (US)

( * ) Notice: Subject to any disclaimer, the term of this patent is extended or adjusted under 35 U.S.C. 154(b) by 673 days.

(21) Appl. No.: 12/008,392

(22) Filed: Jan. 9, 2008

(65) Prior Publication Data
US 2008/0235962 A1    Oct. 2, 2008

Related U.S. Application Data

(60) Provisional application No. 60/879,944, filed on Jan. 10, 2007.

(51) Int. Cl.
*F41G 1/467* (2006.01)
(52) U.S. Cl. .............................. 33/265; 124/87
(58) Field of Classification Search ............... 33/265; 124/87, 90
See application file for complete search history.

(56) References Cited

U.S. PATENT DOCUMENTS

| | | | | |
|---|---|---|---|---|
| 3,997,974 A * | 12/1976 | Larson | ............. | 33/265 |
| 6,725,854 B1 * | 4/2004 | Afshari | ............. | 33/265 |
| 6,817,105 B2 * | 11/2004 | LoRocco | ............. | 33/265 |
| 7,100,291 B2 * | 9/2006 | Afshari | ............. | 33/265 |
| 7,290,345 B2 * | 11/2007 | Ellig | ............. | 33/265 |
| 7,503,321 B2 * | 3/2009 | Afshari | ............. | 33/265 |
| 7,574,810 B1 * | 8/2009 | LoRocco | ............. | 33/265 |
| 7,578,067 B2 * | 8/2009 | Rager | ............. | 33/265 |
| 2007/0227018 A1 * | 10/2007 | Ellig | ............. | 33/265 |
| 2008/0168671 A1 * | 7/2008 | Rager | ............. | 33/265 |
| 2009/0145411 A1 * | 6/2009 | Sims et al. | ............. | 124/25.6 |

\* cited by examiner

*Primary Examiner* — Yaritza Guadalupe-McCall
(74) *Attorney, Agent, or Firm* — Michael R. Schacht; Schacht Law Office, Inc.

(57) ABSTRACT

An optical bow sight which can be accessorized with an adjustable range sighting pin or torque and cant compensation or both of these features, but is fully functional without either accessory. The optical sight has a shrouded array of fiber optics sight pins which are removable from the sight housing with their support as a single unit. The sight pins are clad in a metallic glass because of the corrosion resistance of such materials. Light collected over a wide field falls on segments of the sight pin fibers coiled in the housing of the optical unit or falls on a trap which redirects the light onto the fiber segments. A lens may optionally be employed to promote the collection of ambient light, and a shutter or variable size aperture may be provided to control the light reaching the sight pin fibers. An elastomeric damper can be advantageously mounted on the sight to minimize accuracy effecting shock and/or vibration, and a level bubble may be provided to aid in avoiding cant of the bow to which the sight is mounted.

6 Claims, 10 Drawing Sheets

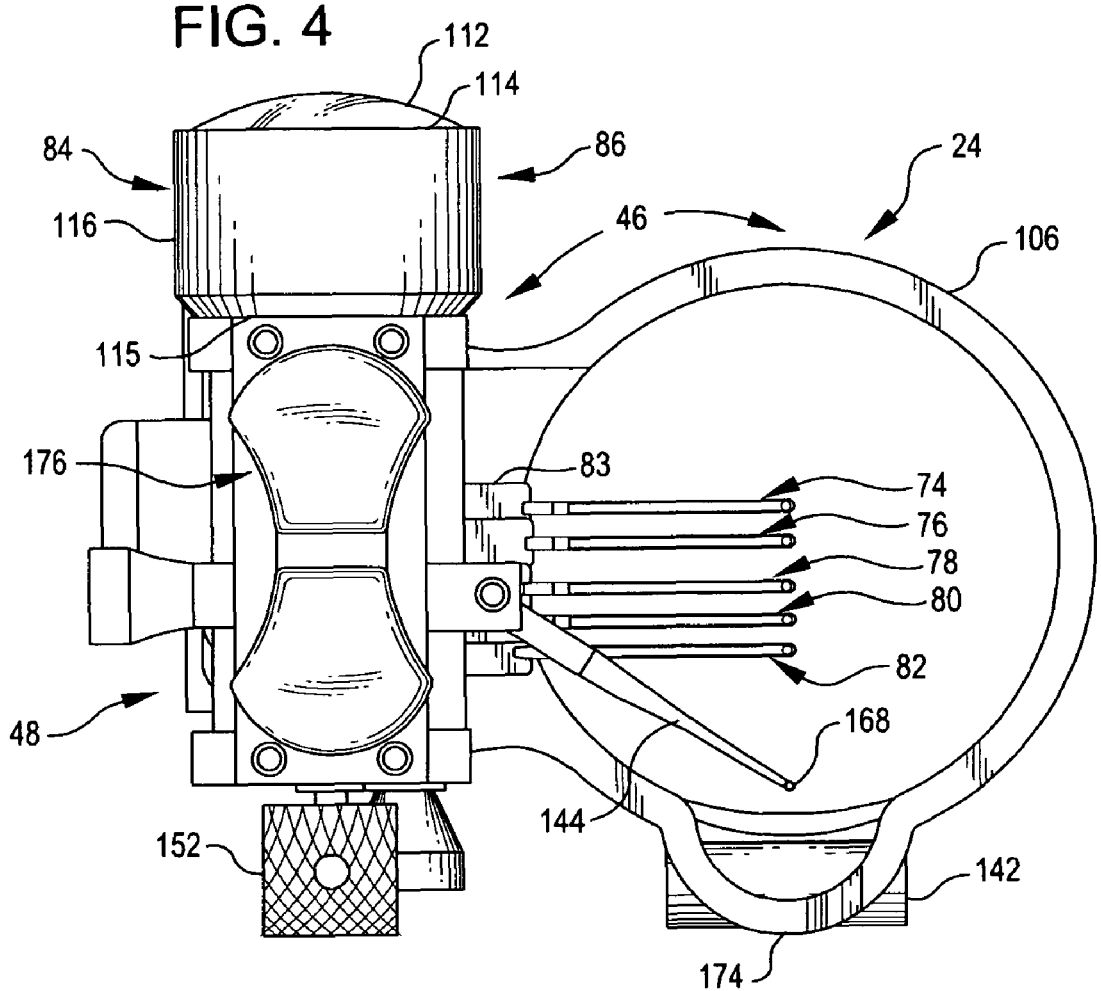
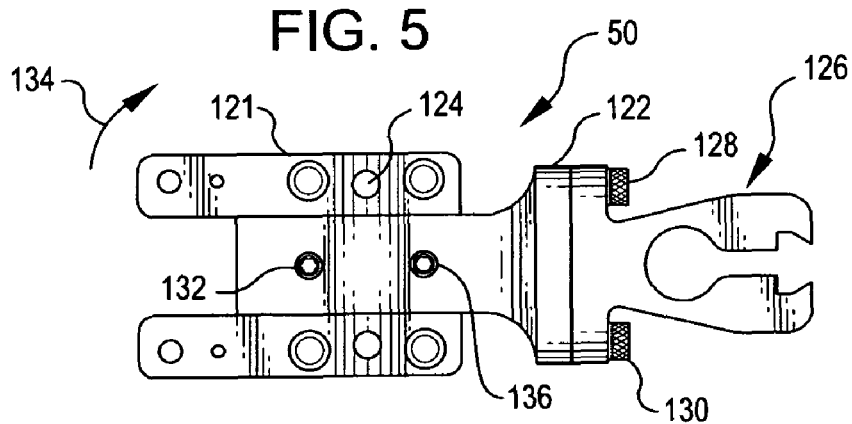

ARCHERY BOW SIGHT

CROSS-REFERENCE TO A RELATED APPLICATION

Applicants are entitled to and hereby claim, the priority of provisional application No. 60/879,944 filed 10 Jan. 2007.

TECHNICAL FIELD OF THE INVENTION

The present invention relates to novel, improved, archery bow sights.

BACKGROUND OF THE INVENTION

A common type of archery bow sight employs a set of vertically-spaced apart sight pins, each corresponding to a different range (distance to a target). These pins are installed in a frame which is mounted to the riser of the bow.

In low-light conditions, those ends of the pins used for sighting can be difficult to see clearly, if at all. Accordingly, it has been proposed that the sighting ends of the pins be illuminated.

One approach that has been suggested involves the use of fiber optics to illuminate the sighting ends of the pins. Sights of that character are disclosed in U.S. Pat. Nos.: 5,435,068 issued 25 Jul. 1995 to Thames, et al., and 7,082,690 issued 1 Aug. 2006 to Knoshnood.

SUMMARY OF THE INVENTION

There have now been invented and disclosed herein new and novel bow sights which likewise employ fiber optics, but have a number of significant features and advantages which are not possessed by previously proposed, fiber optics bow sights.

One such feature is a light collecting system which gathers light over a wide hemispherical field and thereby significantly increases the amount of light that can be transmitted to the sighting ends of the pins, which are the terminal segments of optical fibers. This makes those ends readily visible under even extremely poor lighting conditions. That the sight provides bright, easily seen aiming points when the ambient light is poor is significant because a number of jurisdictions do not allow artificial light to be used in hunting game.

A companion feature of the sights disclosed herein is that the optical fibers are side-loaded as well as end-loaded. This significantly increases the efficiency with which light can be loaded into the fibers. Also, maximizing fiber optic loading reduces the needed lengths of the fibers, which is advantageous from the viewpoints of cost, manufacturability, and serviceability.

A second, related feature is a novel light trap for the collected light. The light trap redirects the collected light onto the optical fibers and also makes a significant contribution to the efficiency of the sight.

Another important feature of the present invention is the encapsulation of the exposed optical fiber segments constituting the sighting pins in a metallic glass such as one of those available from Liquidmetal Technologies. These materials are extremely resistant to corrosion, which is a common problem, particularly in the sights of hunting bows. Metallic glasses may be lighter than competing materials such as steel, have considerable flexibility, and are readily molded.

Yet another feature of the present invention is a novel modular construction which allows a fully functional basic sight to be upgraded to provide additional features. One module adds an adjustable sighting pin for more distant ranges to the sight. Another add-on provides adjustable torque and cant compensation for the bow on which the sight is mounted.

Also significant is the attachment of elastomeric dampers akin to those disclosed in U.S. Pat. No. 5,362,046 issued Nov. 8, 1994, to Sims to the sight at strategic locations. These dampers significantly reduce shock and vibration loads imposed on the sight when the bow is fired, contributing to accuracy and increased service life of the sight, reducing the sound made when the bow is fired, and reducing the possibility of shock and vibration knocking the sight out of alignment.

It is another feature of the invention that the sighting pins and supporting frame are removable from the installable in the sight as a single unit. This is important from the viewpoints of manufacturability and serviceability. Also, this feature makes it convenient for the archer to use interchangeable sight pin units to optimize the bow for different poundage settings and arrow weights.

BRIEF DESCRIPTION OF THE DRAWINGS

FIG. 4 is a rear view of the bow sight;

FIG. 5 is a plan view of an add-on used to adjust the torque on, and the cant of, the bow;

DESCRIPTION OF THE INVENTION

Figure 1:
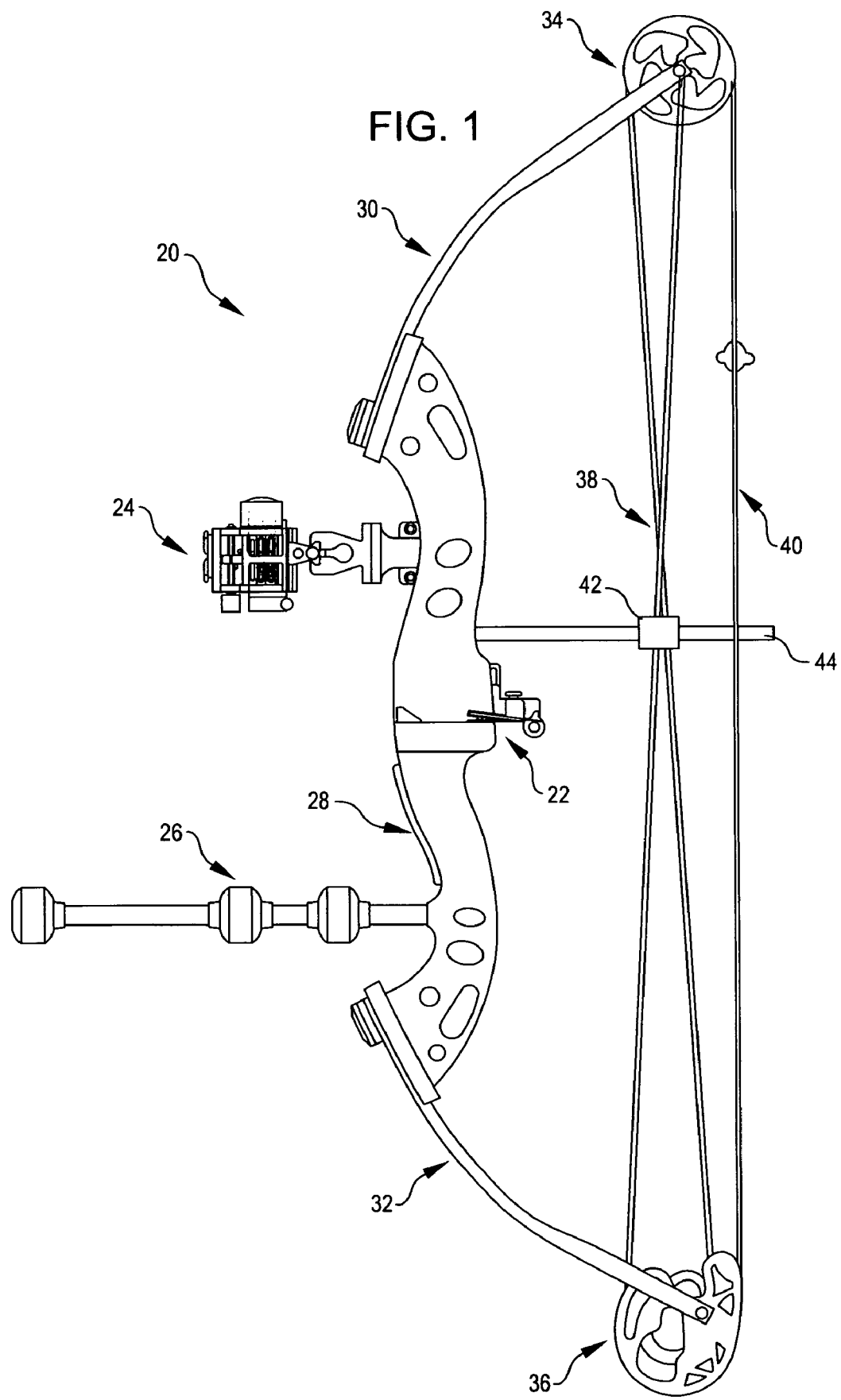
FIG. 1 is a side view of the compound bow equipped with a bow sight which is constructed in accord with, and embodies, the principles of the present invention.
Figure 2:
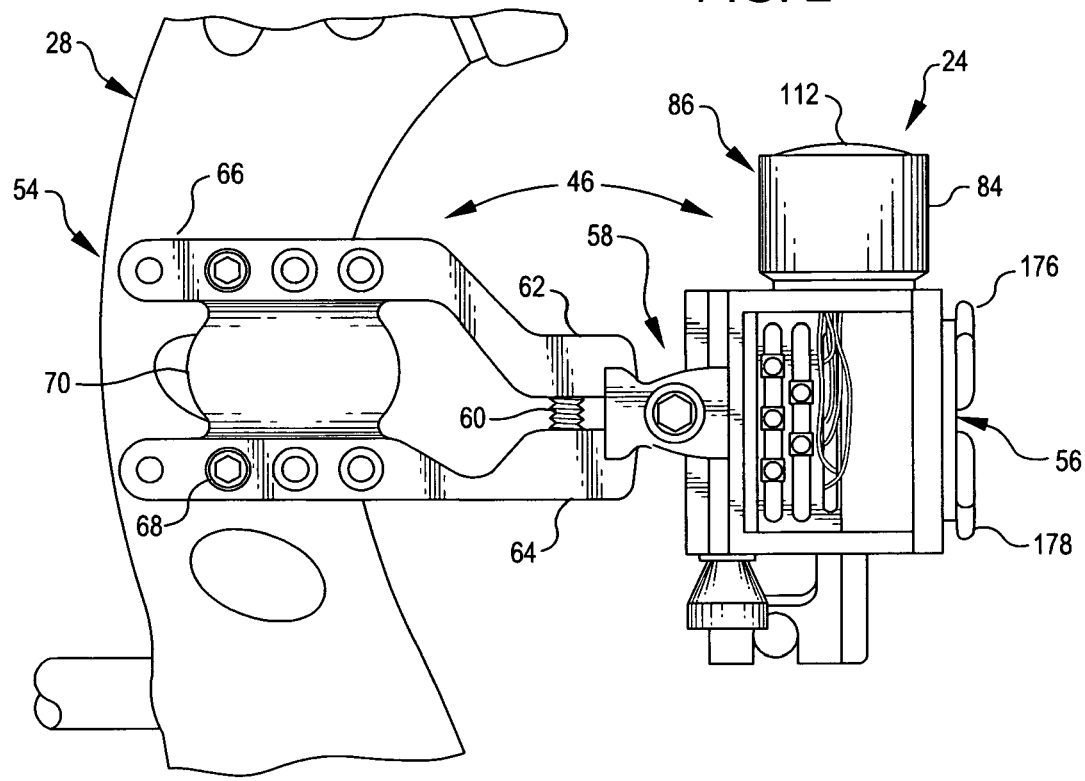
FIG. 2 is a fragmentary view of the bow and the sight; this view is to a larger scale than FIG. 1 and is of the opposite side of the bow and sight; it is the basic, albeit fully functional, sight that is shown in this figure.

Referring now to the illustrations, FIGS. 1 and 2 depict a compound bow 20 equipped with a fall-away arrow rest 22, an optical sight 24, and a modular stabilizer 26. Bow 20 is of conventional construction. It has a riser 28, upper and lower limbs 30 and 32, cams 34 and 36 at the far ends of limbs 30 and 32, bus cables (collectively identified by reference character 38) a bow string 40, and a cable slide 42 mounted on an elongated guide 44.

Bow sight 24 includes a basic unit 46 (FIG. 2), an optional add-on or accessory 48 (FIG. 3) which provides an additional sighting capability, and a second, also optional, add-on or accessory 50. This accessory is employed to adjust torque and cant.

The basic unit 46 is assembled directly to the riser 28 of bow 20 (FIG. 2). If the torque and cant compensation accessory 50 is added, the add-on is assembled to the basic unit; and it is a mounting component of the accessory which is mounted to bow riser 28.

Referring now most particularly to FIGS. 2, 3, 4, 7, 8, and 10, the basic bow sight 46 includes a mounting bracket 54 and a complementary component 56 which functions as a housing and as a support for optical components of the sight. The two components 54 and 56 are connected by a slot-and-dovetail arrangement 58 and a threaded fastener 60. The latter clamps the two legs 62 and 64 of bracket 54 together to securely assemble components 54 and 56.

The two legs 62 and 64 of mounting bracket 54 are attached to the riser 28 of bow 20 as by the headed and threaded fasteners 66 and 68 shown in FIG. 2 to mount sight 24 to the bow.

A plate 70 located therebetween integrates the legs 62 and 64 of mounting bracket 54 into a unitary structure.

The support/housing component 56 of bow sight 24 and the components housed in and supported from that component are best shown in FIGS. 2, 3, 3A-3C, 4, 7, and 8.

Referring now to these figures, it was pointed out above that optical bow sights embodying the principles of the present invention employ vertically-spaced apart sight pins, each of these pins corresponding to a different bow-to-target range. The sight pins of bow sight are identified by reference characters 74 . . . 82.

The sight pins are composed of optical fibers encased in protective housings that are preferably made from a metallic glass. Housings fabricated from the preferred materials are highly resistant to corrosion in contrast to the rust-susceptible metallic pin components of conventional bow sights. Reference characters 82ƒ and 82h in FIGS. 3A and 3B respectively identify the optical fiber and housing of representative sight pin 82.

Figure 3:
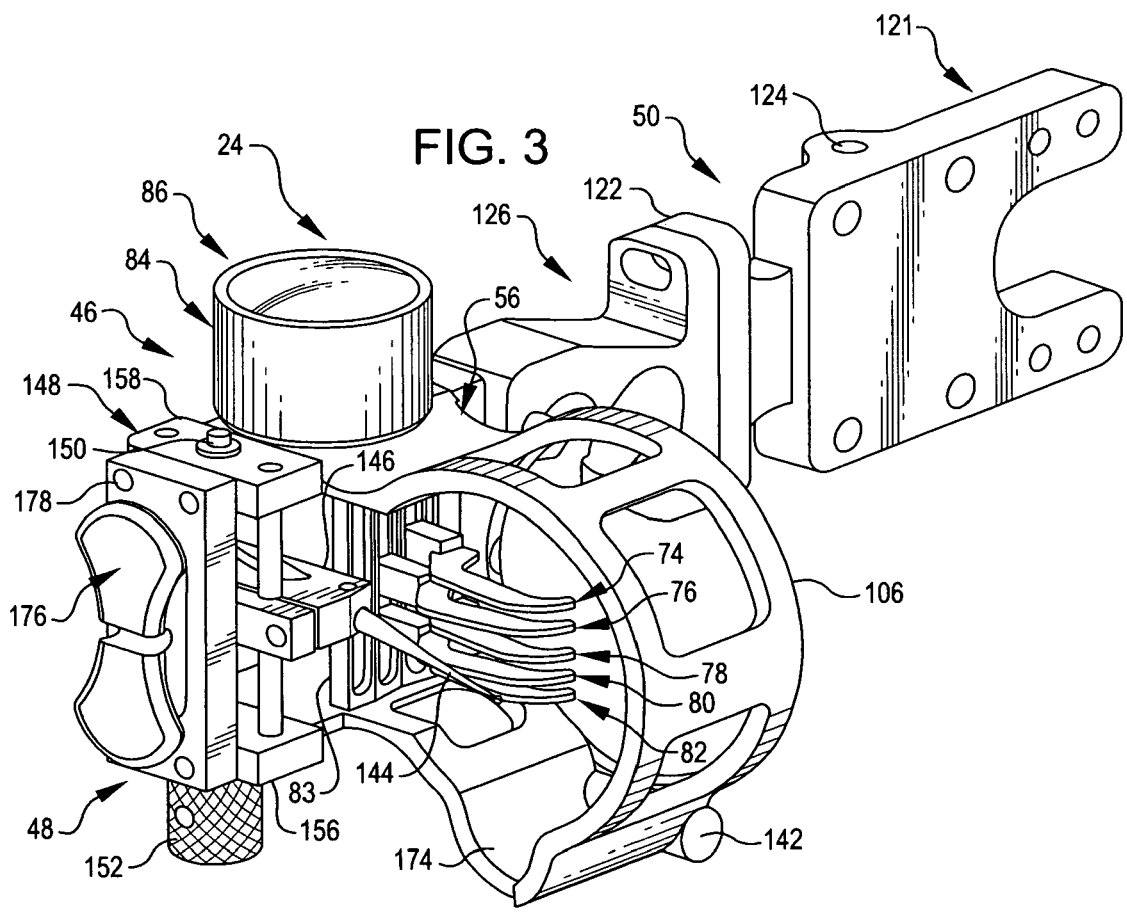
FIG. 3 is a perspective view of the bow sight; two bow sight add-ons (or accessories) are also shown.
Figure 3A:
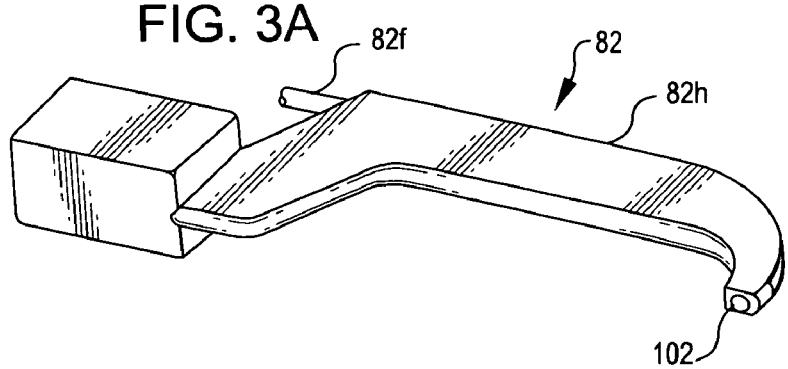
FIG. 3A is a perspective view of one of an array of sight pins which are components of the FIG. 1 bow sight.
Figure 3B:
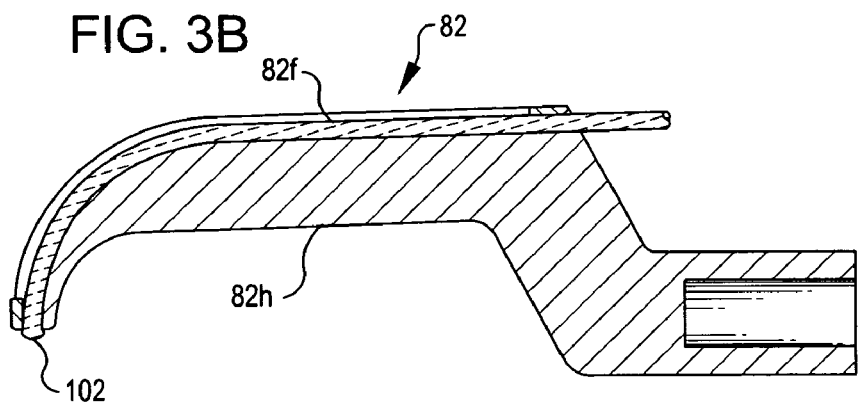
FIG. 3B is a horizontal section through the FIG. 3A sight pin.
Figure 3C:
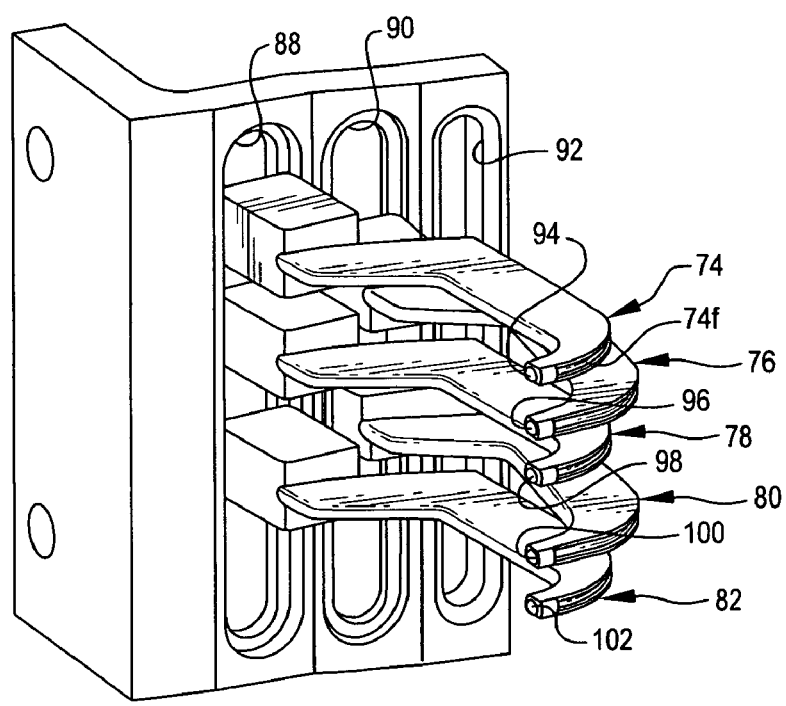
FIG. 3C is a front-to-rear perspective view of an assembly of the array of sight pins and a sight pin support; this assembly can be removed from and installed in the sight as a unit.

The sight pins 74 . . . 82 are mounted to a pin support 83, forming a sight pin assembly 85 (see FIG. 3C). Assembly 85 is housed in bow sight housing/support component 56, which also supports the casing 84 of an optics unit 86. The assembly 85 can be removed from component 56 as a unit, which is advantageous from the viewpoints of manufacturability, serviceability, and interchangeability.

In the currently preferred sight pin assembly shown in FIG. 3C, sight pins 74 . . . 82 are installed in a selected two of three vertical slots 88, 90, and 92 in sight in support 83, slot 88 being nearest the front of the support and slot 92 being nearest its rear. Alternate pins are installed in slots 88 and 90, pins 74, 78, and 82 thus being installed in front slot 88 and pins 76 and 78 being installed in center slot 90. Rear slot 92 provides a protected path for the optical fibers.

Figure 7:
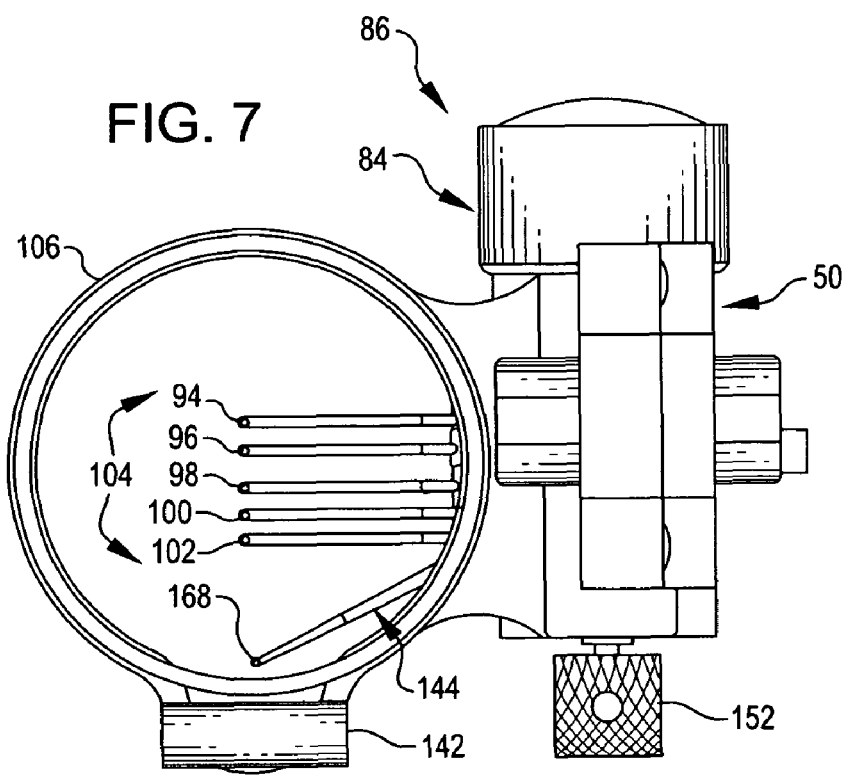
FIG. 7 is a front view of the bow sight.

The distal ends 94 . . . 102 of the sight pin optical are exposed (see FIG. 7). It is these exposed, dot-like features of the sight pins with which a target is acquired. The sight pin housings are curved such that the optical fibers are supported from pin support (or frame 83) with sight features 94-102 facing the archer.

The array 104 of sight pins 74 . . . 82 is surrounded by a shroud 106, also to protect the pins from damage. Shroud 106 is an integral component of support/housing component 56.

Figure 9:
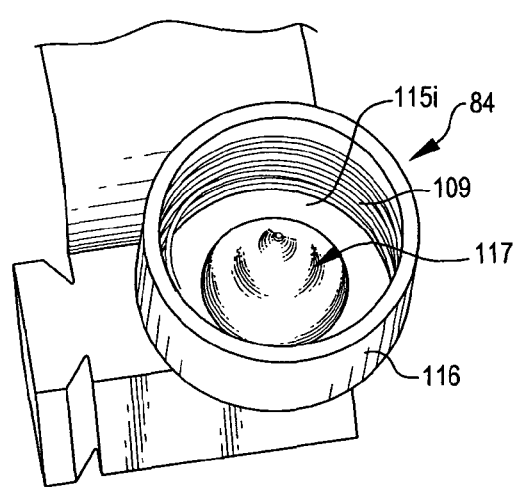
FIG. 9 is a perspective view of an optics unit employed in the FIG. 1 bow sight; this figure shows a single one of the light transmitting, pin sight fibers; these optical fibers are housed in and coiled against the side wall of the optics unit casing.
Figure 10:
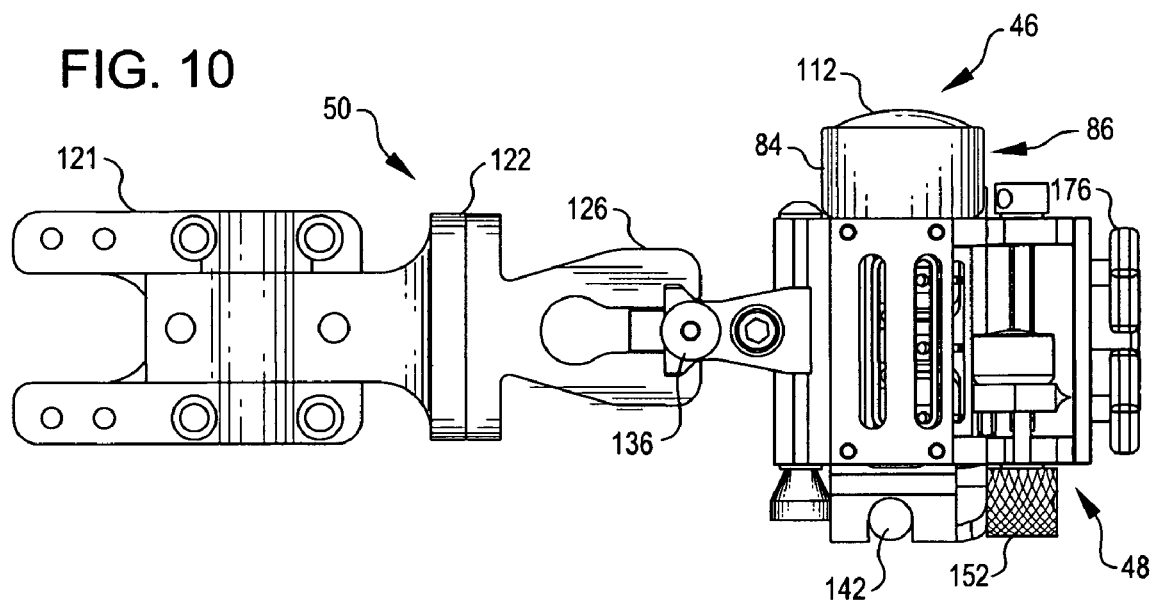
FIG. 10 is a side view of the bow sight.

As shown in FIG. 2, the optical fibers of sight pins 74 . . . 82 are trained through bow sight component 56 to the optics unit 86 of the bow sight. There, the fibers are coiled, one above the other, against the inner side 108 of optics unit casing 86. The lowermost optical fiber 109 (of sight pin 82) is shown in FIG. 9.

Figure 8:
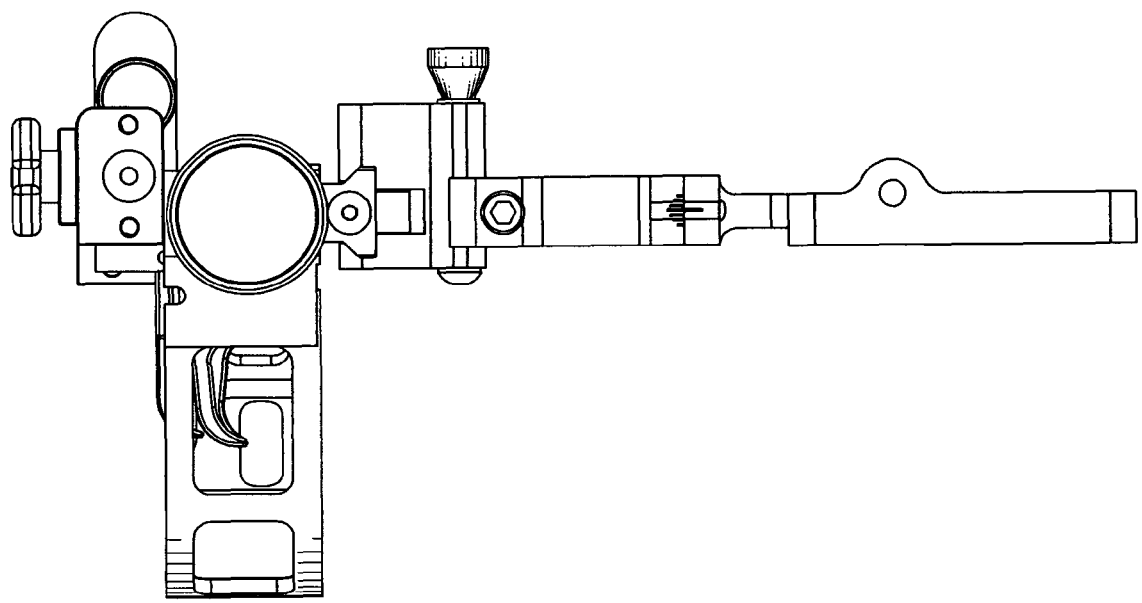
FIG. 8 is a top view of the bow sight.
Figure 13:
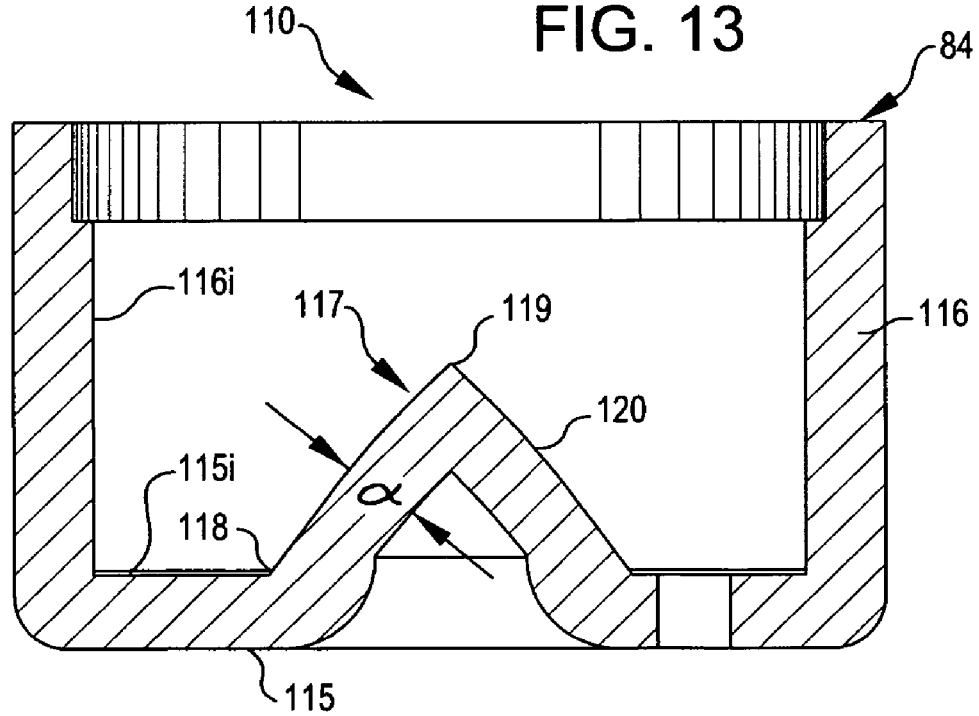
FIG. 13 is a vertical section through a light trap; this trap is a component of the optics unit of the FIG. 1 bow sight.

The casing 84 of optical unit 86 has inner surfaces, described below, which are elements of a light trap 110 (FIGS. 8 and 13). The casing supports a light collecting lens 112 directly above, and in axial alignment with, light trap 110 at the open end 114 of casing 84.

Light trap 110 is a one-piece, typically injection molded component (see FIG. 13). The light trap includes: the inner surface 115i of the bottom wall 115 of casing 84; the inner surface 116i of casing side wall 116; and a conical, cored-out, integral element 117 with: (a) a uniform wall thickness "T", (b) a base 118, (c) an apex 119, and (d) a convex external surface 120. The light trap may be made from any appropriate polymer as by injection molding, for example. The light trap surfaces are coated by vapor deposition or otherwise treated to make those surfaces highly reflective.

Lens 112 gathers light from a field which encompasses almost an entire hemisphere. Light reaching light trap 110 through lens 112 may fall on the external surface 120 of conical element 117, the optical fibers in and coiled against the wall 116 of casing 84, the inside surface 116i of wall 116, or the inner surface 115i of casing bottom wall 115. Light that does not directly strike the optical fibers is reflected and/or redirected onto the fibers. Therefore, essentially all of the incident light reaches and is loaded into the fibers; and the optical unit is highly efficient in collecting light from the ambient surroundings and in insuring that the collected light reaches the optical fibers for transmission through the fibers to the sighting dots 94-102 at the ends of the fibers.

Lens 112 is not a mandatory component of optical bow sights embodying the principles of the present invention. Even without a lens, light will fall on and into light trap 110 and be loaded into the optical fibers housed in casing 84 essentially in the manner discussed above.

Turning now primarily to FIGS. 3, 5, 8, and 10 the torque and cant adjustment accessory or add-on 50 includes two brackets, 121 and 122, connected by a vertically-extending hinge pin 124 and a mounting bracket 126 which replaces the mounting bracket 54 of the basic bow sight 46. Mounting bracket 126 is assembled to bracket 122 with threaded fasteners 128 and 130 (FIG. 5). The optical components of sight 46 are attached to mounting bracket 126 of accessory 50 in the same above-discussed manner and with the same type of slot-and-dovetail coupling and threaded fastener that those components are attached to mounting bracket 54 of basic bow sight 46.

A variety of factors, such as a particular archer's grip, the balance of the bow, the angle of a shot, whether the archer is shooting from a tree stand or other elevated position, shooting uphill, etc. causes the archer to impose torque—that is a force pivoting the bow to the left or right about a vertical axis—on the bow. An important feature of accessory 50 is that it can be employed to provide compensation for the torque. Specifically, by tightening setscrew 132, bracket 121 and the optical components carried by that bracket, especially the sighting pins, are shifted to the right, i.e., in the direction indicated by arrow 132 in FIG. 5. Conversely, by tightening complementary setscrew 136, bracket 121 is shifted in the opposite direction to move the supported optical components to the left.

Figure 11:
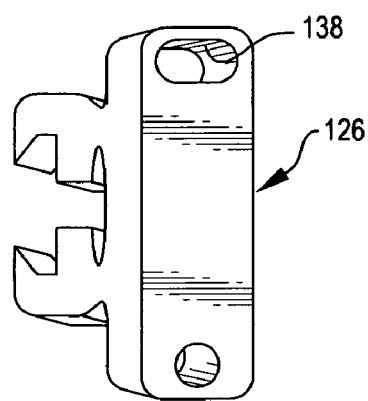
FIG. 11 is a perspective view of a component of the FIG. 5 add-on configured to provide for adjustment of the cant of the bow.

The fastener 128 securing the mount 121 of accessory 50 to optical unit-supporting bracket 126 extends through a laterally oriented adjustment slot 138 in the support (see FIG. 11) and is threaded into mount 121.

Figure 12:
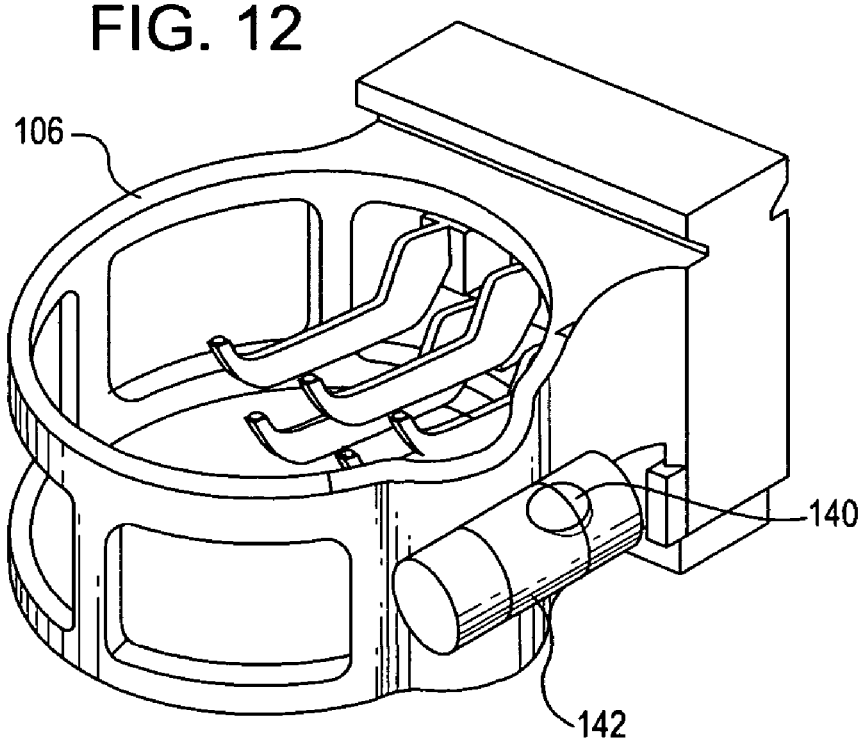
FIG. 12 is a fragmentary view of the bow sight included to show a level with a bubble that is centered for cant-free, optimum bow performance.

The cant of the optical sight is adjusted by loosening fasteners 128 and 130, rotating optical unit support 126 about the lower fastener until the bubble 140 of a level 142 mounted on the bottom of sight pin shroud 106 (see FIG. 12) is centered, and then retightening fasteners 128 and 130. This cant compensation adjustment can contribute significantly to accuracy.

Figure 6:
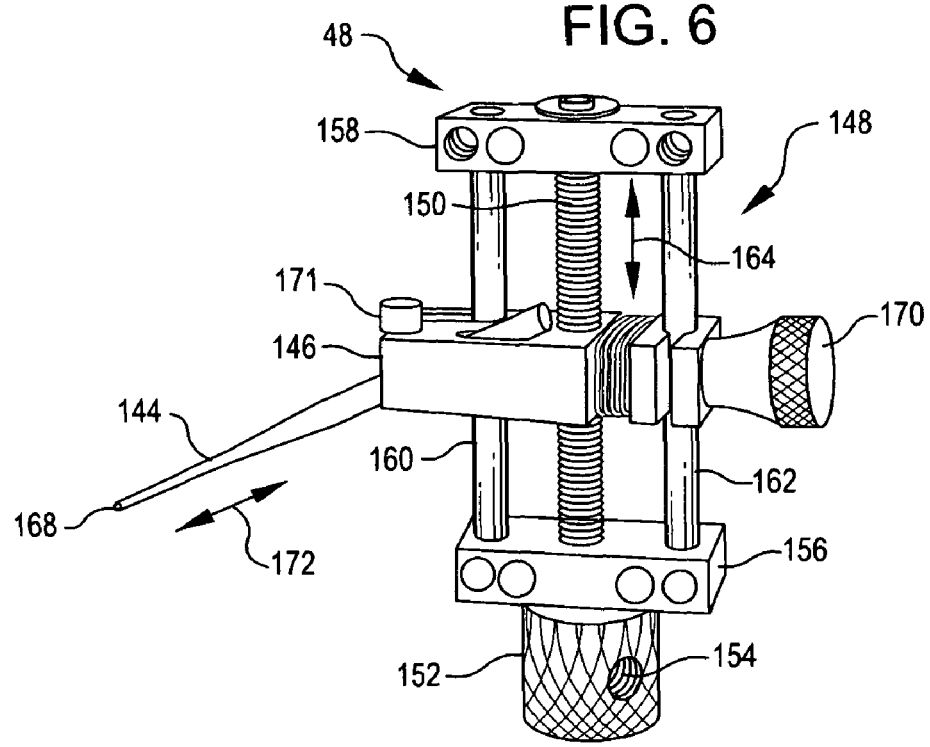
FIG. 6 is a perspective view of an add-on used to provide an additional sighting pin that can be adjusted for (typically) longer range shots.

Turning now most particularly to FIGS. 3, 5, and 6, it was pointed out above that the optional add-on or accessory 48 is employed to provide a sight pin for a range greater than those ranges for which sight pins 74 . . . 82 are intended. Accessory 48 is bolted or otherwise mounted to the basic bow sight unit 46 in the location shown in FIGS. 3 and 4.

Accessory 48 includes a sight pin 144 mounted to a support 146, a carriage 148, and an elongated, threaded member 150 supported from and rotatable in, the carriage. The threaded member is rotated by a knob 152 fixed to member 150 by setscrew 154.

Carriage 148 has end plates 156 and 158. Posts 160 and 162 extend between and are mounted at their opposite ends to end plates 156 and 158. Threaded member 150 is located equidistantly between posts 160 and 162 as shown in FIG. 6.

Sight pin support 146 can be moved vertically up and down on posts 160 and 162 as indicated by double-headed arrow 164 in FIG. 6. Specifically, elongated member 150 is threaded through an internally-threaded extension 166 of sighting pin support 146. Consequently, as the threaded member 150 is rotated, the support 146 and sight pin 144 are moved vertically up and vertically down to locate the aiming point 168 at the end of the sighting pin at the height appropriate for a selected bow-to-target range. The support is locked in place by rotating knob 170.

The aiming feature 168 of sight pin 144 can be moved in and out of sight pin mount 146 to align aiming feature 168 with respect to the aiming features 94 . . . 102 of sight pins 74 . . . 82. This is accomplished by loosening a screw 171 threaded into pin mount 146, shifting the sight pin into or out of support 146 as indicated by double-headed arrow 172, and then retightening the screw.

As is best shown in FIGS. 3 and 4, there is a dimple 174 at the bottom of sight pin shroud 106. This increases the distance over which the sighting end 168 of sight pin 144 can be displaced with a concomitant increase in the ranges for which sight pin 144 can be used.

Another important feature of the present invention, employed whether or not it is the basic sight 46 that is involved, or that sight with one or both of the accessories 48 and 50 discussed above, is an elastomeric shock and vibration damper 176. In the case of the basic unit, the damper is mounted on that vertical wall 178 of bow sight component 56 opposite mounting bracket 54 (see FIG. 2). If accessory 48 is also present, damper 176 is instead mounted on that side of the accessory opposite the basic bow sight 46 (see FIGS. 3 and 4). Damper 176 makes a significant contribution to smooth and quiet operation of bow 20; and it reduces the possibility that shock and/or vibration might damage bow sight 24.

Figure 14:
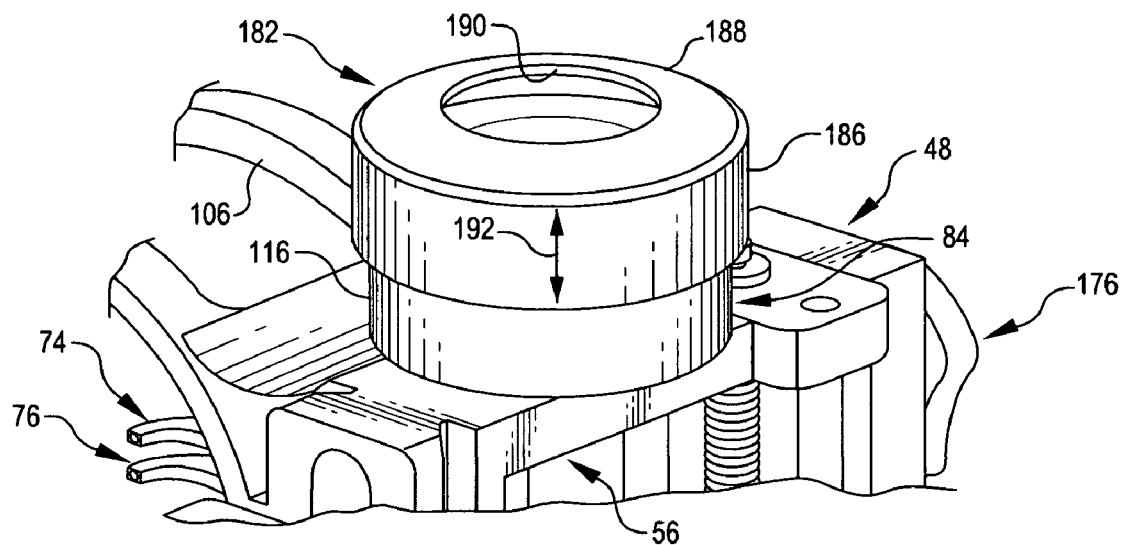
FIG. 14 is a perspective view showing: (a) a fragment of the bow sight including the optics unit, and (b) an elastomeric diaphragm mechanism that can be employed to control the light reaching the light trap of the optics unit.

It is advantageous to be able to control the light which reaches light trap 110. This can be done with, for example, an apertured elastomeric boot 182 as shown in FIGS. 14 and 15 or an adjustable shutter mechanism 184 as shown in FIGS. 16 and 17.

Boot 182 has a side wall element 186 and an integral diaphragm 188 with a central aperture 190. The boot is slid down over optics unit casing side wall 116 and retained in place by friction. The size of aperture 190 controls the light reaching light trap 110. By exerting a downward, arrow 192 force on the boot, the diaphragm 188 can be stretched, increasing the size of aperture 190 and, consequentially, that proportion of incident light reaching trap 110.

Figure 15:
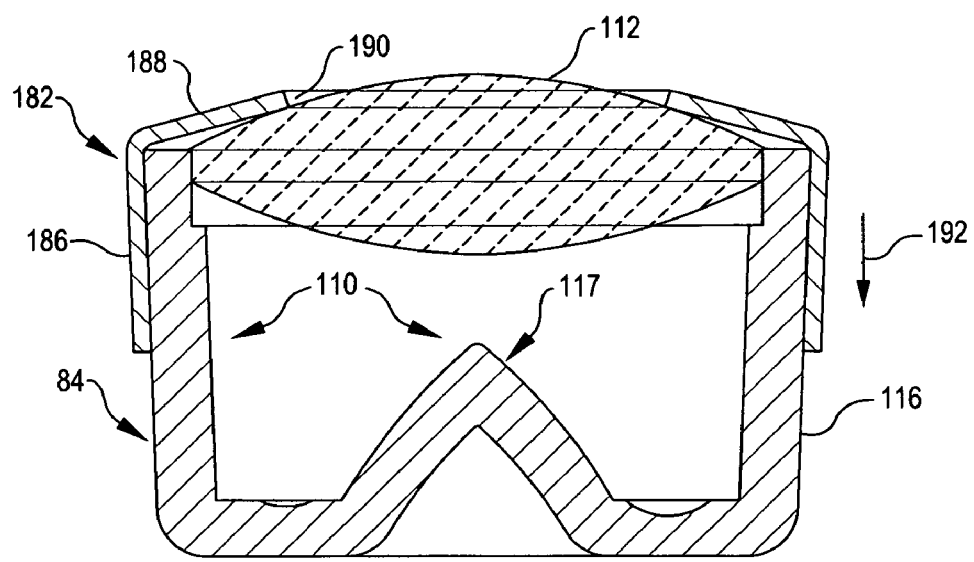
FIG. 15 is a section through the optics unit and the elastomeric diaphragm mechanism.
Figure 16:
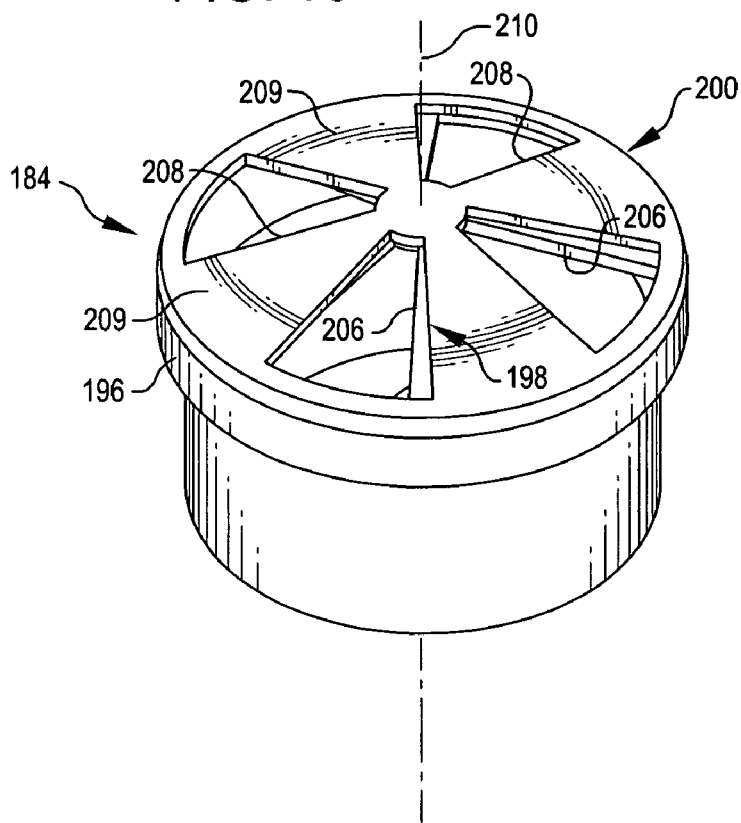
FIG. 16 is a perspective view of the optics unit and an adjustable shutter mechanism that can be employed to control light reaching the optics unit light trap.
Figure 17:
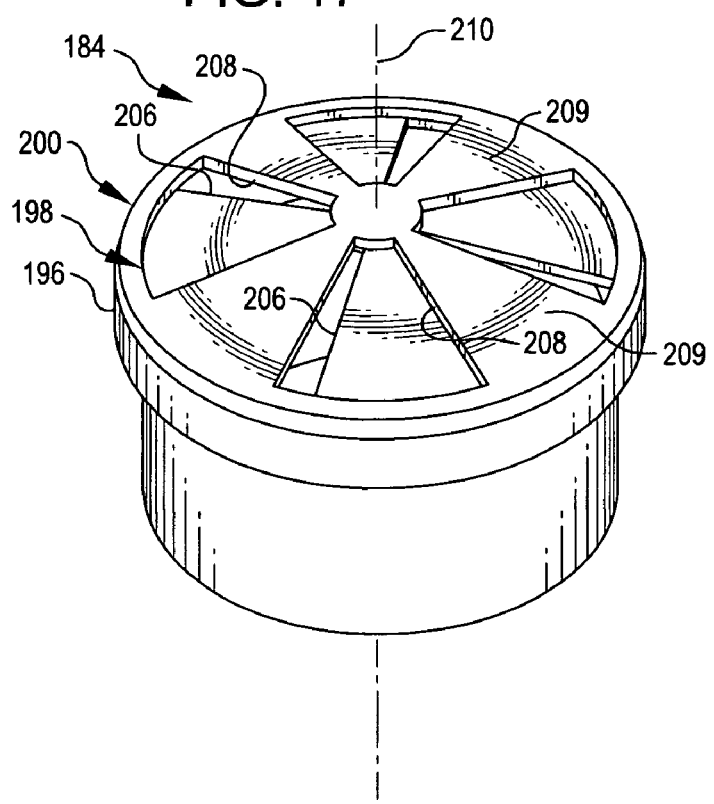
FIG. 17 is a view like FIG. 16 but with the shutter of the light controlling mechanism adjusted to further restrict the light reaching the light trap.

The shutter mechanism 184 shown in FIGS. 15 and 16 has a cylindrical casing 196, a stationary plate 198, and a complementary shutter 200.

Plate 198 and shutter 200 have arrays 202 and 204 of complementary trapezoidal apertures 206 and 208. Plate is fixedly mounted in the upper end of casing 196, and shutter 200 is mounted above plate 198 for rotation about a vertical axis 210.

Rotating shutter 200 about axis 210 changes the fraction of incident light that can reach light trap 110 through apertures 206 and 208. With shutter 200 rotated relative to plate 198 as shown in FIG. 16, the apertures 206 in plate 198 and the apertures 208 in shutter 200 are nearly aligned; and most of the incident light passes through aperture 208 and then aperture 206 to light trap 110. When shutter 200 is rotated about axis 210 to the orientation shown in FIG. 17, imperforate areas 209 of the shutter span the major parts of the apertures 206 in plate 198. This reduces the size of the aperture 206, 208 light passages, and, consequentially, substantially reduces that fraction of the incident light which can reach trap 110.

Light controlling shutter mechanism 184 is assembled in any convenient manner over the open upper end 114 of optics unit casing 84.

The light controlling mechanism shown in FIGS. 14-17 can be employed irrespective of whether or not the optics unit of the associated bow sight has a lens.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

The invention claimed is:
1. A sighting device which comprises:
a fiber optics sighting component;
wide field optics for collecting ambient light and loading the fiber optics of the sighting component with collected light; and
an optics unit casing which has a side wall, a bottom wall, and an open end,
a light trap comprising a conical component with a substantially uniform thickness;
the conical light trap component having a base at the bottom wall of the optics unit casing; and the sighting component fiber optics having a segment disposed in the optics unit casing and coiled against the side wall of the casing.

2. A sighting device as defined in claim 1
wherein the optics unit casing has an open end; and
the wide field optics further comprises a light collecting lens which is operatively juxtaposed to, and overlies, the open end of the optics unit casing.

3. A sighting device as defined in claim 1 which comprises an adjustable shutter for controlling the light reaching the optics unit casing, the adjustable shutter including juxtaposed stationary and movable plates with complementary apertures.

4. A sighting device as defined in claim 1 which comprises a stretchable component with an aperture of regulatable size for controlling the light reaching optics unit casing.

5. A sighting device as defined in claim 1 wherein:
the optics unit casing has a side wall;
the optical sighting component fiber having a segment disposed in the casing and coiled against the side wall of the casing.

6. A sighting device as defined in claim 1 which has a highly reflective coating on light trap surfaces on which light can fall.

* * * * *